United States Patent [19]
Schilling

[11] Patent Number: 5,282,358
[45] Date of Patent: Feb. 1, 1994

[54] GAS TURBINE ENGINE DUAL INNER CENTRAL DRIVE SHAFT

[75] Inventor: Jan C. Schilling, Middletown, Ohio

[73] Assignee: General Electric Company, Cincinnati, Ohio

[21] Appl. No.: 705,844

[22] Filed: May 28, 1991

[51] Int. Cl.$^5$ .............................. F02K 3/02
[52] U.S. Cl. ........................ 60/226.1; 415/68; 415/122.1; 180/376; 464/183
[58] Field of Search ............... 60/226.1, 39.75; 415/60, 68, 69, 122.1, 216.1; 417/407; 180/376, 377, 378; 464/179, 183

[56] References Cited

U.S. PATENT DOCUMENTS

| | | | |
|---|---|---|---|
| 1,891,505 | 12/1932 | Scudder | 464/183 |
| 2,161,138 | 6/1939 | Cutting | 464/183 |
| 3,077,074 | 2/1963 | Collman et al. | 415/60 |
| 3,091,382 | 5/1963 | Shelley | 230/116 |
| 3,174,680 | 3/1965 | Young | 230/117 |
| 3,194,083 | 7/1965 | Ballard | 464/183 |
| 3,423,048 | 1/1969 | Clarke et al. | 415/122.1 |
| 3,723,022 | 3/1973 | Olson | 417/407 |
| 4,127,080 | 11/1978 | Lakiza et al. | 115/76 |
| 4,313,712 | 2/1982 | Briggs | 416/2 |
| 4,452,567 | 6/1984 | Treby et al. | 416/2 |
| 4,473,998 | 10/1984 | King | 60/39.091 |
| 4,623,297 | 11/1986 | Beam, Jr. | 415/122.1 |
| 4,834,693 | 5/1989 | Profant et al. | 464/183 |

FOREIGN PATENT DOCUMENTS 0811525 8/1951 Fed. Rep. of Germany ...... 464/183

Primary Examiner—Richard A. Bertsch
Assistant Examiner—Michael I. Kocharov
Attorney, Agent, or Firm—Jerome C. Squillaro

[57] ABSTRACT

A dual inner central drive shaft in a gas turbine engine includes rearward and forward shaft portions which overlap and interengage with one another. The rearward shaft portion includes an elongated cylindrical inner middle portion and a rear conical end portion, whereas the forward shaft portion includes an elongated cylindrical outer middle portion and a front conical end portion. The respective opposite ends of the inner and outer middle portions of the rearward and forward shaft portions have intermeshing rear and front sets of radially projecting and circumferentially spaced splines which extend parallel to the shaft axis so as to rigidly secure the outer and inner middle portions of the rearward and forward shaft portions together for concurrent rotary motion of the rearward and forward shaft portions in both clockwise and counterclockwise directions.

16 Claims, 2 Drawing Sheets

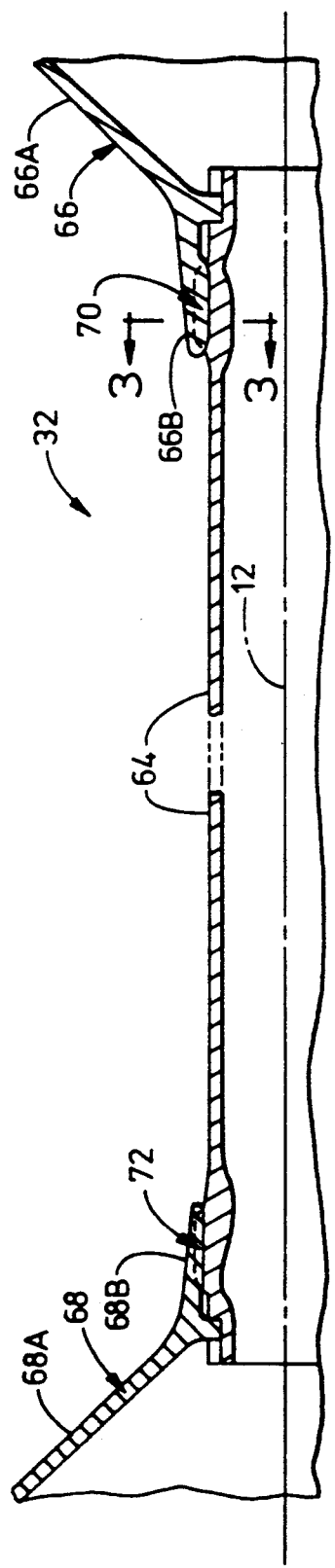
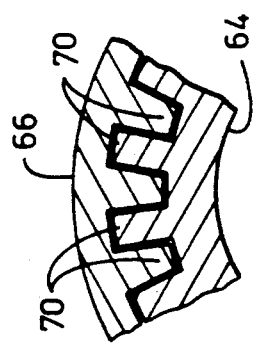
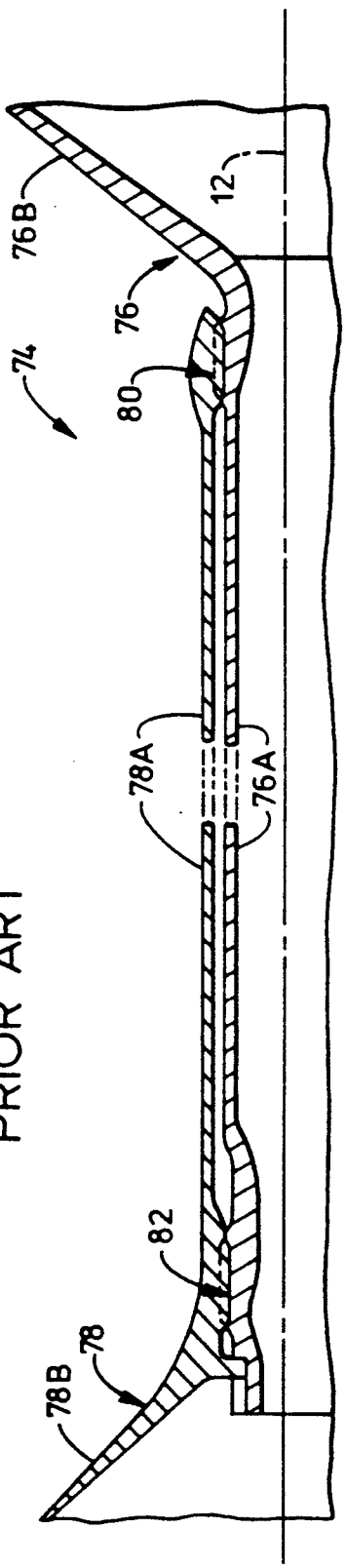

GAS TURBINE ENGINE DUAL INNER CENTRAL DRIVE SHAFT

BACKGROUND OF THE INVENTION

1. Field of the Invention

The present invention relates generally to gas turbine engines and, more particularly, to a dual inner central drive shaft for transmitting increased torque from the low pressure turbine to the forward fan without increasing the diameter size of the inner central drive shaft.

2. Description of the Prior Art

Gas turbine engines typically include a core engine having a compressor for compressing air entering the core engine, a combustor where fuel is mixed with the compressed air and then burned to create a high energy gas stream, and a first or high pressure turbine which extracts energy from the gas stream to drive the compressor. In aircraft turbofan engines, a second turbine or low pressure turbine located downstream from the core engine extracts more energy from the gas stream for driving a forward fan. The forward fan provides the main propulsive thrust generated by the engine.

More particularly, in the turbofan engine, the energy from the core engine drives the low pressure turbine, and the latter, in turn, drives an inner central drive shaft of a given diameter size which runs forwardly through the center of the core engine. The inner central drive shaft drives the forward fan to produce thrust. The inner central drive shaft must carry or transmit all of the torque that is necessary to drive the fan.

As the bypass ratios of turbofan engines increase (which means that a greater proportion of the air flow is routed externally of the core engine for producing thrust as compared to internally through the core engine where it is mixed with fuel and ignited for producing gas energy), the core engine in effect becomes smaller. Also, with increased bypass ratio, more torque is required to drive the forward fan.

The conventional solution would be to make the inner central drive shaft larger in diameter in order to accommodate more torque. However, this approach would require a complete redesign of the core engine (if using existing engines) which adds weight and is extremely costly, and an increase in the size of bearings which reduces their useful lives. For a new engine, larger bore sizes add much weight to the core and has the same adverse effect on bearings.

Consequently, a need still exists for an alternative solution to providing more torque to drive the forward fan.

SUMMARY OF THE INVENTION

The present invention provides a dual inner central drive shaft designed to satisfy the aforementioned need. The dual inner central drive shaft of the present invention permits transmitting increased torque to the engine fan without the necessity of increasing the diameter size of the inner central drive shaft.

Accordingly, the present invention is directed to a dual central drive shaft in a gas turbine engine which comprises: (a) a rearward shaft portion composed of an elongated cylindrical - middle portion and a rear end portion; (b) a forward shaft portion composed of an elongated cylindrical middle portion and a front end portion; (c) the middle portion of one of the forward and rearward shaft portions surrounding the other thereof in an overlapping and concentric relationship to a longitudinal axis defined by the middle portions; and (d) interengaging elements defined at opposite ends of the middle portions of the forward and rearward shaft portions and extending generally parallel to the longitudinal axis for rigidly securing the middle portions of the rearward and forward shaft portions together for concurrent rotary motion of the rearward and forward shaft portions in both clockwise and counterclockwise directions.

More particularly, the interengaging elements are circumferentially spaced and radially projecting splines. The middle shaft portions of the respective rearward and forward shaft portions have lengths substantially greater than the length of the splines. The middle shaft portions extend substantially the full distance between the rear and front end portions of the rearward and forward shaft portions. Also, the rear end portion of the rearward shaft portion and the front end portion of the forward shaft portion each have a conical configuration in cross section.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged fragmentary foreshortened longitudinal axial sectional view of a prior art inner central drive shaft of the gas turbine engine of FIG. 1.

FIG. 3 is an enlarged fragmentary cross-sectional view of the prior art inner central drive shaft taken along line 3—3 of FIG. 2.

FIG. 4 is a fragmentary foreshortened longitudinal axial sectional view, on the same scale as FIG. 2, of a dual inner central drive shaft in accordance with the present invention.

DETAILED DESCRIPTION OF THE INVENTION

Figure 1:
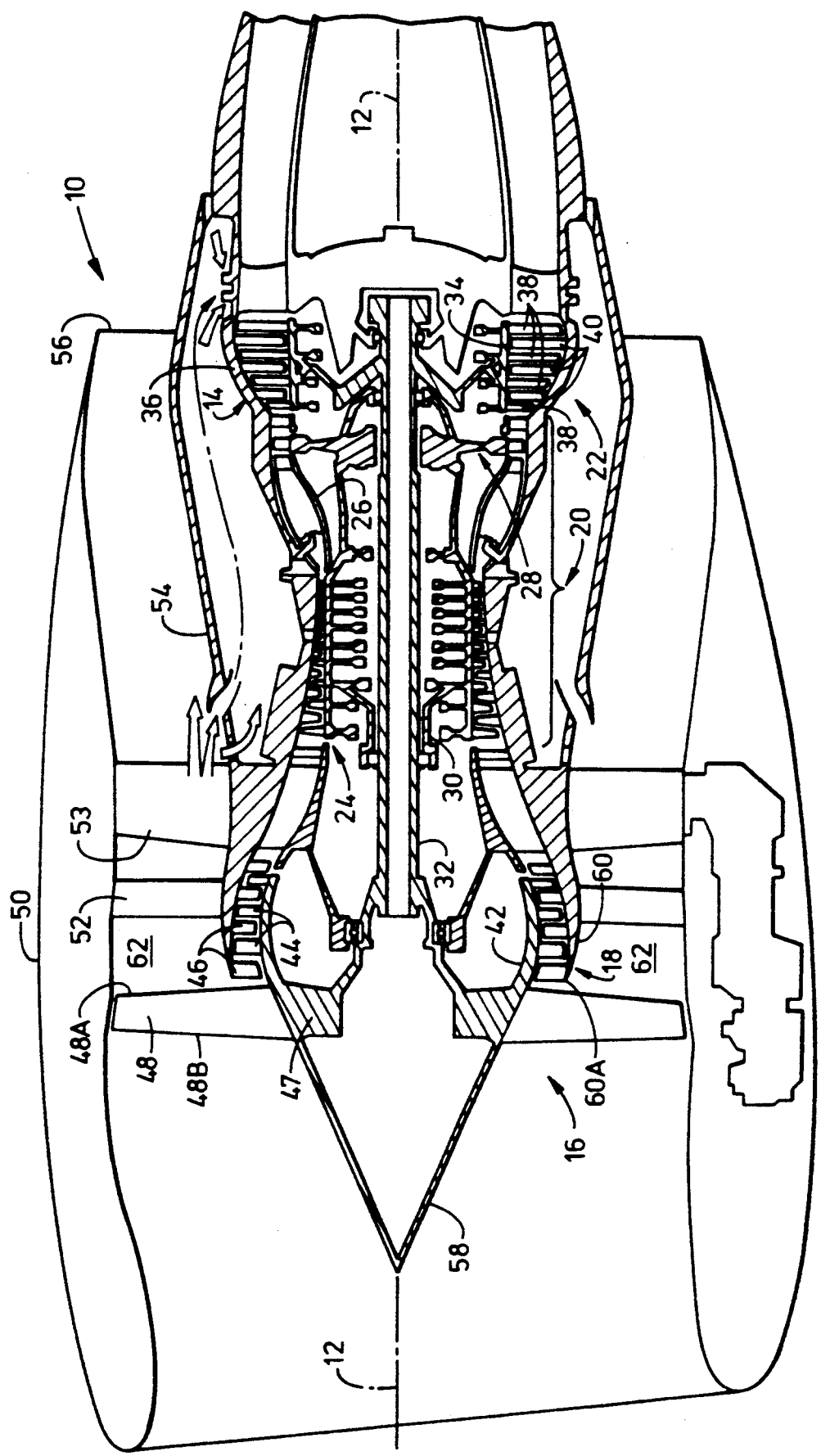
FIG. 1 is a longitudinal axial sectional view of a prior art gas turbine engine.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Gas Turbine Engine

Referring now to the drawings, and particularly to FIG. 1, there is illustrated a prior art gas turbine engine, generally designated 10. The engine 10 has a longitudinal center line or axis 12 and a stationary annular casing 14 disposed coaxially and concentrically about the axis 12. The engine 10 includes a forward fan 16 and booster compressor 18, a middle core engine 20 and an aft low pressure power turbine 22. The core engine 20 encompasses a multi-stage compressor 24, a combustor 26 and a high pressure turbine 28, either single or multiple stage, all arranged coaxially about the longitudinal axis 12 of the engine 10 in a serial flow relationship. An annular outer drive shaft 30 fixedly interconnects the compressor 24 and high pressure turbine 28 of the core engine 20.

The compressor 24 is rotatably driven to compress air entering the core engine 20 to a relatively high pressure. This high pressure air is then mixed with fuel in the combustor 26 and ignited to form a high energy gas stream. This gas stream flows aft and passes through the high pressure turbine 28, rotatably driving it and the outer drive shaft 30 of the core engine 20 which, in turn, rotatably drives the multi-stage compressor 24.

In the engine 10 being of the turbofan type, the residual gas stream discharged by the core engine high pressure turbine 28 is expanded through a second, power turbine, which as mentioned above is the aft low pressure turbine 22. The aft low pressure turbine 22 is rotated by gas stream flow and, in turn, drives the forward fan 16 and booster compressor 18 via a separate inner central drive shaft 32 which extends forwardly through the annular outer drive shaft 30 of the core engine 20. Although some thrust is produced by the residual gas stream exiting the core engine 20, most of the thrust produced is generated by the forward fan 16.

The low pressure turbine 22 includes an annular rotatable rotor 34 and a stationary stator 36 disposed radially outwardly of the rotor 34. The low pressure turbine rotor 34 includes a plurality of turbine blade rows 38 extending radially outwardly therefrom and axially spaced from one another. The low pressure turbine stator 36 includes a plurality of stator vane rows 40 fixedly attached to and extending radially inwardly from the stationary casing 14. The stator vane rows 40 are axially spaced so as to alternate with the turbine blade rows 34 and define therewith multiple stages of the low pressure turbine 22.

The forward booster compressor 18 driven by the low pressure turbine 22 via the inner central drive shaft 32 includes a rotor 42 and a plurality of booster blade rows 44 fixedly attached to and extending radially outwardly from the rotor 42 for rotation therewith. A plurality of booster stator vane rows 46 are fixedly attached to and extend radially inwardly from the stationary casing 14. Both the booster blade rows 44 and the stator vane rows 46 are axially spaced and so arranged to alternate with one another.

A fan disc 47, supported by the inner central drive shaft 32, supports a row of circumferentially-spaced fan blades 48 of the forward fan 16. The row of fan blades 48 is housed within a nacelle 50 of the engine 10 supported about the stationary casing 14 by a plurality of radially extending and circumferentially spaced struts 52, 53. A cowling 54 which encloses the core engine 20 and low pressure turbine 22 is disposed within and extends coaxially with a rear portion of the nacelle 50 so as to define therewith a discharge nozzle 56.

Typically, the turbofan engine 10 also includes a spinner nose 58 projecting forwardly from the row of fan blades 48. Both the spinner nose 58 and row of fan blades 48 are supported by the fan disc 47. Further, a splitter fairing 60 is provided on the forward portion of the cowling 54. The spinner nose 58 pierces an air stream flow drawn through the nacelle 50 by rotation of the row of the fan blades 48 and the splitter fairing 60 separates the air stream flow into an inner portion which enters the core engine 20 and an outer portion which bypasses the core engine, flowing through an annular bypass duct 62 located rearwardly of the fan blades 48 and between the outer annular nacelle 50 and inner splitter fairing 60. Most of the thrust produced by the engine 10 is generated by the air flow bypassing the core engine 20 through the annular bypass duct 62.

Prior Art Inner Central Drive Shaft

Referring to FIG. 2, there is illustrated in greater detail the inner central drive shaft 32 which extends forwardly through the center of the outer drive shaft 30 and the center of the middle core engine 20. The inner central drive shaft 32 being of a given diameter size will transmit a known maximum amount of the torque produced by the low pressure turbine 22 to the rotor 42 mounting the fan disc 47 and fan blades 48 for rotatably driving the forward fan 16 to produce thrust.

The inner central drive shaft 32 includes an elongated cylindrical tubular middle portion 64 and a pair of opposite rear and front end portions 66, 68. The rear end portion 66 of the drive shaft 32 is composed of a rear conical section 66A and a front cylindrical section 66B. The front end portion 68 of the drive shaft 32 is composed of a front conical section 68A and a rear cylindrical section 68B. The respective rear and front cylindrical sections 66B, 68B of the shaft end portions 66, 68 and the opposite ends of the shaft middle portion 64 having interfitting elements defined thereon in the form of intermeshing rear and front sets of radially projecting and circumferentially-spaced splines 70, 72, as also seen in FIG. 3. The respective rear and front cylindrical sections 66B, 68B are generally coextensive with the axial splines 70, 72 and thus are of relatively short lengths.

Each of the splines 70, 72 of the rear and front sets thereof extends parallel to the axis 12 so as to rigidly secure the shaft middle portion 64 with the shaft end portions 66, 68 in both clockwise and counterclockwise directions of rotation of the shaft 32. Thus, torque produced by the rotary motion of the rotor 34 of the aft low pressure turbine 22 can be transmitted to the fan disc 47 of the forward fan 14 via the rear end portion 66, middle portion 64 and front end portion 68 of the inner central shaft 32, all of which shaft portions are rigidly interconnected together by the sets of intermeshed axially-extending splines 70, 72.

The inner central drive shaft 32 must carry or transmit all of the torque that is necessary to drive the fan 16. An increase in the bypass ratio of the turbofan engine 10 requires that more torque be transmitted by the inner central drive shaft 32 to drive the forward fan 16.

On conventional turbofans the fan shaft itself is not limiting in terms of carrying the torsional load, the spline joint is the limiting factor. Spline effectiveness is reduced if the length of the spline is too large compared to the spline diameter. Thus, the primary objective of the present invention is to get the high torque from the turbine to the fan through the same access hole while not making the spline limiting. This is accomplished by putting part of the torque through two splines which are of a diameter smaller than a single shaft and with each spline taking only about one-half the torque of a single shaft.

Dual Inner Central Drive Shaft of Present Invention

Referring now to FIG. 4, there is illustrated the preferred embodiment of the dual inner central drive shaft of the present invention, generally designated 74. The dual inner central shaft 74 of the present invention permits transmitting increased torque to the engine fan without the necessity of increasing the maximum diameter size of the middle portion of the inner central drive shaft 74 above the maximum diameters of the respective inner cylindrical sections 66B, 68B of the prior art inner central drive shaft 32.

The dual inner central drive shaft 74 includes rearward and forward shaft portions 76, 78 which overlap and interengage with one another. The rearward shaft portion 76 of the dual drive shaft 74 includes an elongated cylindrical inner middle portion 76A and a rear conical end portion 76B, whereas the forward shaft portion 78 includes an elongated cylindrical outer middle portion 78A and a front conical end portion 78B. The respective outer and inner middle portions 78A, 76A are spaced from one another.

The respective opposite ends of the inner and outer middle portions 76A, 78A of the rearward and forward shaft portions 76, 78 have interfitting elements thereon in the form of intermeshing rear and front sets of radially projecting and circumferentially-spaced splines 80, 82. Each of the splines 80, 82 of the rear and front sets thereof have the same configurations in cross-section as shown in FIG. 3 with respect to the prior art sets of splines 70, 72. Thus, the splines 80, 82 of each set intermesh and extend parallel to the axis 12 so as to rigidly secure the outer and inner middle portions 76A, 78A of the rearward and forward shaft portions 76, 78 for concurrent rotary motion in both clockwise and counterclockwise directions.

Thus, torque produced by the rotary motion of the rotor 34 of the aft low pressure turbine 22 can be transmitted to the fan disc 47 of the forward fan 14 via the rigidly interconnected rearward and forward shaft portions 76, 78. As readily apparent in FIG. 4, the lengths of the outer and inner middle shaft portions 76A, 78A are substantially greater than the lengths of the splines 80, 82. The outer and inner middle shaft portions 76A, 78A extend substantially the full distance between the rear and front conical end portions 76B, 78B of the rearward and forward shaft portions 76, 78.

The total torsional load on the dual inner drive shaft 74 is split between the rear and front sets of splines 80, 82. This load split is a function of the 7stiffnesses of the rearward and forward shaft portions 6, 78. The outer forward shaft portion 78 is inherently stiffer by virtue of its larger diameter and so may carry a higher torque than the inner rearward shaft portion 76.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A central drive shaft in a gas turbine engine, comprising:
    (a) a rearward shaft portion composed of an elongated cylindrical middle portion and a rear end portion;
    (b) a forward shaft portion composed of an elongated cylindrical middle portion and a front end portion;
    (c) said middle portion of one of said forward and rearward shaft portions surrounding the other thereof in an overlapping and concentric relationship to a longitudinal axis defined by said middle portions; and
    (d) interengaging elements defined at opposite ends of said middle portions of said forward and rearward shaft portions and extending generally parallel to said longitudinal axis for rigidly securing said middle portions of said rearward and forward shaft portions together for concurrent rotary motion of said rearward and forward shaft portions in both clockwise and counterclockwise directions.

2. The shaft as recited in claim 1, wherein said interengaging elements are circumferentially spaced and radially projecting splines.

3. The shaft as recited in claim 2, wherein said middle shaft portion of said rearward shaft portion has a length substantially greater than the length of said splines.

4. The shaft as recited in claim 3, wherein said middle shaft portion of said rearward shaft portion extends substantially the full distance between said rear and front end portions of said rearward and forward shaft portions.

5. The shaft as recited in claim 2, wherein said middle shaft portion of said forward shaft portion has a length substantially greater than the length of said splines.

6. The shaft as recited in claim 5, wherein said middle shaft portion of said forward shaft portion extends substantially the full distance between said rear and front end portions of said rearward and forward shaft portions.

7. The shaft as recited in claim 1, wherein said rear end portion of said rearward shaft portion has a conical configuration in cross section.

8. The shaft as recited in claim 1, wherein said front end portion of said forward shaft portion has a conical configuration in cross section.

9. A central drive shaft in a gas turbine engine, comprising:
    (a) a rearward shaft portion composed of an elongated cylindrical inner middle portion and a rear end portion;
    (b) a forward shaft portion composed of an elongated cylindrical outer middle portion and a front end portion;
    (c) said middle portion of said forward shaft portion surrounding said middle portion of said rearward shaft portion in an overlapping and concentric relationship to a longitudinal axis defined by said middle portions; and
    (d) interengaging elements defined at opposite ends of said middle portions of said forward and rearward shaft portions and extending generally parallel to said longitudinal axis for rigidly securing said middle portions of said rearward and forward shaft portions together for concurrent rotary motion of said rearward and forward shaft portions in both clockwise and counterclockwise directions.

10. The shaft as recited in claim 9, wherein said interengaging elements are circumferentially spaced and radially projecting splines.

11. The shaft as recited in claim 10, wherein said middle shaft portion of said rearward shaft portion has a length substantially greater than the length of said splines.

12. The shaft as recited in claim 11, wherein said middle shaft portion of said rearward shaft portion extends substantially the full distance between said rear and front end portions of said rearward and forward shaft portions.

13. The shaft as recited in claim 10, wherein said middle shaft portion of said forward shaft portion has a length substantially greater than the length of said splines.

14. The shaft as recited in claim 13, wherein said middle shaft portion of said forward shaft portion extends substantially the full distance between said rear and front end portions of said rearward and forward shaft portions.

15. The shaft as recited in claim 9, wherein said rear end portion of said rearward shaft portion has a conical configuration in cross section.

16. The shaft as recited in claim 9, wherein said front end portion of said forward shaft portion has a conical configuration in cross section.

* * * * *